(12) United States Patent
Ficociello

(10) Patent No.: US 8,939,453 B1
(45) Date of Patent: Jan. 27, 2015

(54) UTILITY HAND TRUCK

(71) Applicant: Paul V. Ficociello, Rockland, MA (US)

(72) Inventor: Paul V. Ficociello, Rockland, MA (US)

( * ) Notice: Subject to any disclaimer, the term of this patent is extended or adjusted under 35 U.S.C. 154(b) by 99 days.

(21) Appl. No.: 13/895,072

(22) Filed: May 15, 2013

(51) Int. Cl.
  *B62B 1/02* (2006.01)
  *B62B 1/14* (2006.01)

(52) U.S. Cl.
  CPC ..................................... *B62B 1/147* (2013.01)
  USPC ..................................... 280/47.18; 280/47.26

(58) Field of Classification Search
  CPC ............ B62B 1/12; B62B 1/14; B62B 1/147; B62B 2202/50; E01H 5/02
  USPC ........ 280/47.12, 47.131, 47.17, 47.18, 47.19, 280/47.23, 47.24, 47.26, 47.27, 47.28, 280/47.29; 15/257.1, 257.2, 257.5, 257.7, 15/257.8; 206/373, 503, 216
  See application file for complete search history.

(56) References Cited

U.S. PATENT DOCUMENTS

| | | | | |
|---|---|---|---|---|
| 3,121,963 A * | 2/1964 | Nolan | ............................. | 37/265 |
| 3,475,838 A * | 11/1969 | Hagen et al. | .................... | 37/265 |
| 3,677,571 A * | 7/1972 | Maturo et al. | ................. | 280/654 |
| 3,774,930 A * | 11/1973 | Pravednekow | ............. | 280/47.24 |
| 3,894,748 A * | 7/1975 | Ratcliff | .......................... | 280/641 |
| 4,048,735 A * | 9/1977 | Brunty | ............................. | 37/434 |
| 4,161,073 A * | 7/1979 | Oakes | ............................. | 37/265 |
| 4,336,951 A * | 6/1982 | Crothers | ..................... | 280/47.26 |
| 4,570,961 A * | 2/1986 | Chateauneuf et al. | ..... | 280/47.18 |
| 4,709,440 A * | 12/1987 | Conelly | ........................ | 15/257.3 |
| 4,887,837 A * | 12/1989 | Bonewicz et al. | ............ | 280/654 |
| 5,502,871 A * | 4/1996 | Reyes | ............................ | 15/257.1 |
| D396,924 S * | 8/1998 | Cardenas | ....................... | D34/24 |
| 6,082,757 A * | 7/2000 | Lin | ................................ | 280/654 |
| 6,450,337 B1 * | 9/2002 | Campagna et al. | ............ | 206/373 |
| 6,666,465 B2 * | 12/2003 | Chan | ........................... | 280/47.26 |
| 6,789,807 B2 * | 9/2004 | Morrison et al. | .......... | 280/47.19 |
| 6,945,546 B2 * | 9/2005 | Guirlinger | ................. | 280/47.19 |
| 7,168,714 B2 * | 1/2007 | Gibbs | ......................... | 280/47.34 |
| 7,210,689 B2 * | 5/2007 | Guirlinger | ................. | 280/47.19 |
| D603,121 S * | 10/2009 | Schwager | ...................... | D34/18 |
| 7,819,407 B1 * | 10/2010 | Charitun | .................... | 280/47.18 |
| 7,857,328 B1 * | 12/2010 | Boss | .......................... | 280/47.25 |
| D632,448 S * | 2/2011 | Simko et al. | .................... | D34/12 |
| 7,937,859 B2 * | 5/2011 | Downes | ......................... | 37/434 |
| 7,984,916 B2 * | 7/2011 | Schwager | ....................... | 280/62 |
| 8,136,822 B2 * | 3/2012 | Harrison | .................... | 280/47.17 |
| 8,181,974 B1 * | 5/2012 | Galvan et al. | ................ | 280/79.5 |
| 8,348,286 B2 * | 1/2013 | Arakawa et al. | ........... | 280/47.19 |
| 8,459,515 B1 * | 6/2013 | Weis | ............................... | 224/401 |
| D707,010 S * | 6/2014 | Ficociello | ..................... | D34/27 |
| 2002/0185831 A1 * | 12/2002 | Chan | .......................... | 280/47.26 |
| 2004/0206517 A1 * | 10/2004 | Gibbs | ............................ | 172/42 |
| 2007/0120337 A1 * | 5/2007 | Gibbs | ............................ | 280/79.3 |
| 2008/0203688 A1 * | 8/2008 | Meyers et al. | ............. | 280/47.29 |
| 2009/0051133 A1 * | 2/2009 | Oshiro | ........................ | 280/47.18 |
| 2010/0230918 A1 * | 9/2010 | Harrison | .................... | 280/47.17 |
| 2010/0253025 A1 * | 10/2010 | Smith | ......................... | 280/47.27 |
| 2011/0042980 A1 * | 2/2011 | Wiseman, II | ................... | 294/49 |

\* cited by examiner

*Primary Examiner* — Brodie Follman
(74) *Attorney, Agent, or Firm* — Salter & Michaelson

(57) ABSTRACT

A utility hand truck that includes an upright frame having a top end that includes a handle, elongated spaced apart vertical posts, a bottom end that includes a base support plate and spaced apart wheels at the bottom end; a front bucket; securing members that are for removable attachment of the front bucket between the elongated spaced apart vertical posts, and the base support plate; and a rear foot board that is constructed and arranged for support from the upright frame and disposed between the spaced apart wheels. The bucket scoops material at ground level while the rear foot board is useable in pushing the bucket forward and in tilting the upright frame and bucket.

18 Claims, 6 Drawing Sheets

UTILITY HAND TRUCK

FIELD OF THE INVENTION

The present invention relates in general to a utility hand truck and pertains, more particularly, to an improved version of a hand truck that can also function as storage bucket.

BACKGROUND OF THE INVENTION

There is a need for a simple and effective apparatus for transporting such products as stones, gravel, and loam. One classical apparatus for this is a wheelbarrow. However, a wheelbarrow tends to be quite unstable; and one has to usually shovel the stone, gravel, or loam into the bed of the wheelbarrow, thus requiring an additional step. Other existing apparatus is expensive, particularly motorized vehicles.

Accordingly, it is an object of the present invention to provide an improved utility hand truck that employs a hand dolly-type frame with a front-loaded bucket.

Another object of the present invention is to provide an improved utility hand truck that enables such material as gravel, loam, and dirt to be easily loaded into the bucket and subsequently tilted for transport.

Still another object of the present invention is to provide an improved utility hand truck that is non-motorized, that is relatively simple in construction, that is effective in operation, and that can be constructed relatively inexpensively.

SUMMARY OF THE INVENTION

To accomplish the foregoing and other objects, features and advantages of the present invention there is provided a utility hand truck comprising: an upright frame having a top end that includes a handle, elongated spaced apart vertical posts, a bottom end that includes a base support plate and spaced apart wheels at the bottom end; a front bucket; securing members that are for removable attachment of the front bucket between the elongated spaced apart vertical posts, and the base support plate; and a rear foot board that is constructed and arranged for support from the upright frame and disposed between the spaced apart wheels; said bucket constructed and arranged to scoop material at ground level while the rear foot board is useable in pushing the bucket forward and in tilting the upright frame and bucket.

In accordance with other aspects of the present invention there is a tool and at least one pouch for the tool and attached to the upright frame; a tool support post for holding the tool and positioned adjacent to and between the spaced apart vertical posts; the bucket is comprised of a bottom wall, a back wall and opposed sidewalls, all said walls interconnected to form a one piece bucket; the bottom wall has a downwardly tapered front edge, and said sidewalls each have a forwardly directed and inwardly tapered edge; each sidewall has an arcuate contour and further including a top wall having a depth that is less than the depth of the bottom wall; the rear foot board comprises a planar board and a pair of spaced apart support pieces that respectively support ends of the rear support board from the upright frame; the foot board has a top planar surface that is meant for engagement with a user's foot; the planar surface is angled at approximately 45 degrees to the vertical; and the spaced apart support pieces are secured at a top end thereof to the rear foot board and at a lower end thereof to an axle that connects the wheels and the base support plate.

In accordance with the present invention there is also provided a combination utility hand truck and tool carrier, comprising: an upright frame having a top end that includes a handle, elongated spaced apart vertical posts, a bottom end that includes a base support plate and spaced apart wheels at the bottom end; a front bucket for removable attachment between the elongated spaced apart vertical posts, and the base support plate; and a rear foot board that is constructed and arranged for support from the upright frame and disposed between the spaced apart wheels; a tool and at least one pouch for the tool and attached to the upright frame; and a tool support post for holding the tool and positioned adjacent to and between the spaced apart vertical posts.

In accordance with still other aspects of the present invention the bucket is constructed and arranged to scoop material at ground level while the rear foot board is useable in pushing the bucket forward and in tilting the upright frame and bucket; including side-by-side pouches for holding multiple tools, and wherein the tool support post is capable of receiving any one of a number of different tools; the bucket is comprised of a bottom wall, a back wall and opposed sidewalls, all said walls interconnected to form a one piece bucket; the bottom wall has a downwardly tapered front edge, and said sidewalls each have a forwardly directed and inwardly tapered edge; each sidewall has an arcuate contour and further including a top wall having a depth that is less than the depth of the bottom wall; the rear foot board comprises a planar board and a pair of spaced apart support pieces that respectively support ends of the rear support board from the upright frame; the foot board has a top planar surface that is meant for engagement with a user's foot; and the planar surface is angled at approximately 45 degrees to the vertical, and wherein the spaced apart support pieces are secured at a top end thereof to the rear foot board and at a lower end thereof to an axle that connects the wheels and the base support plate.

BRIEF DESCRIPTION OF THE DRAWINGS

It should be understood that the drawings are provided for the purpose of illustration only and are not intended to define the limits of the disclosure. The foregoing and other objects and advantages of the embodiments described herein will become apparent with reference to the following detailed description when taken in conjunction with the accompanying drawings in which the figure is a schematic diagram of a race track to illustrate the principles of the present invention.

DETAILED DESCRIPTION

Figure 1:
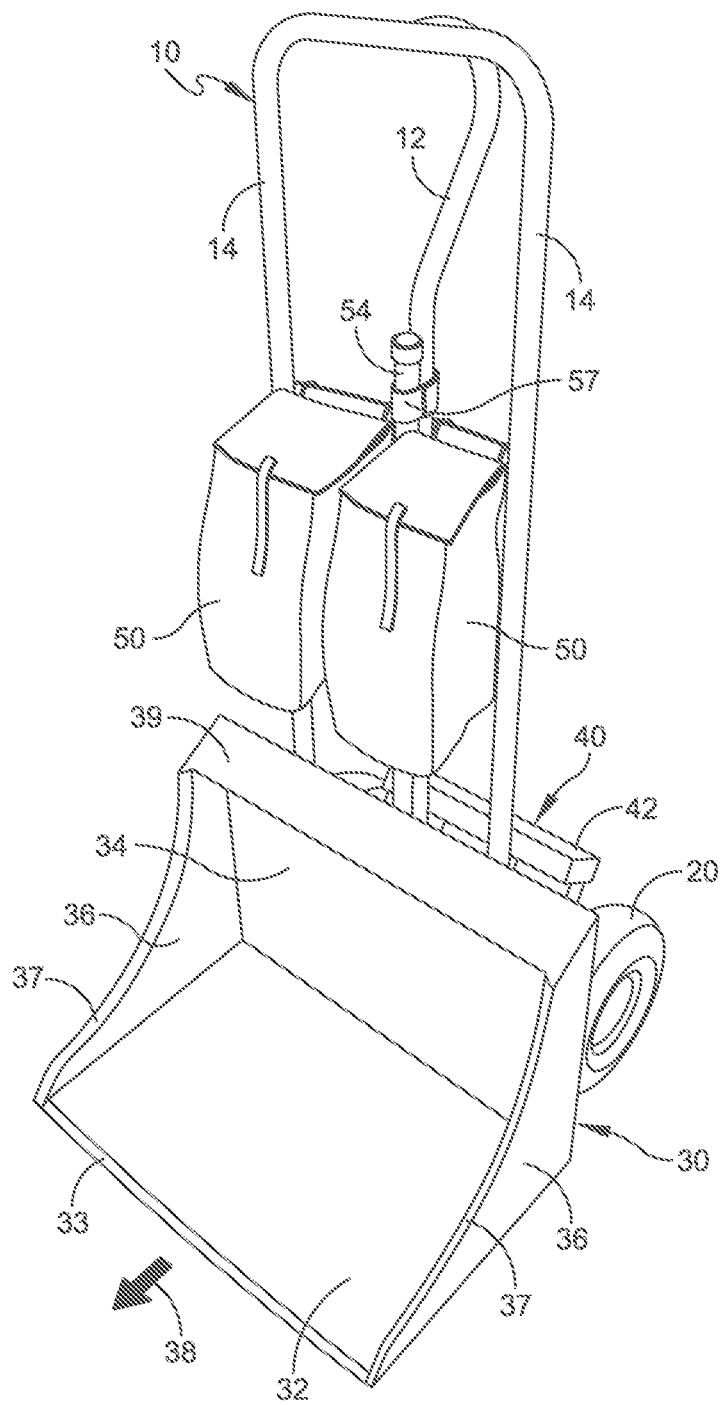
FIG. 1 is a front perspective view of the utility hand truck of the present invention.
Figure 2:
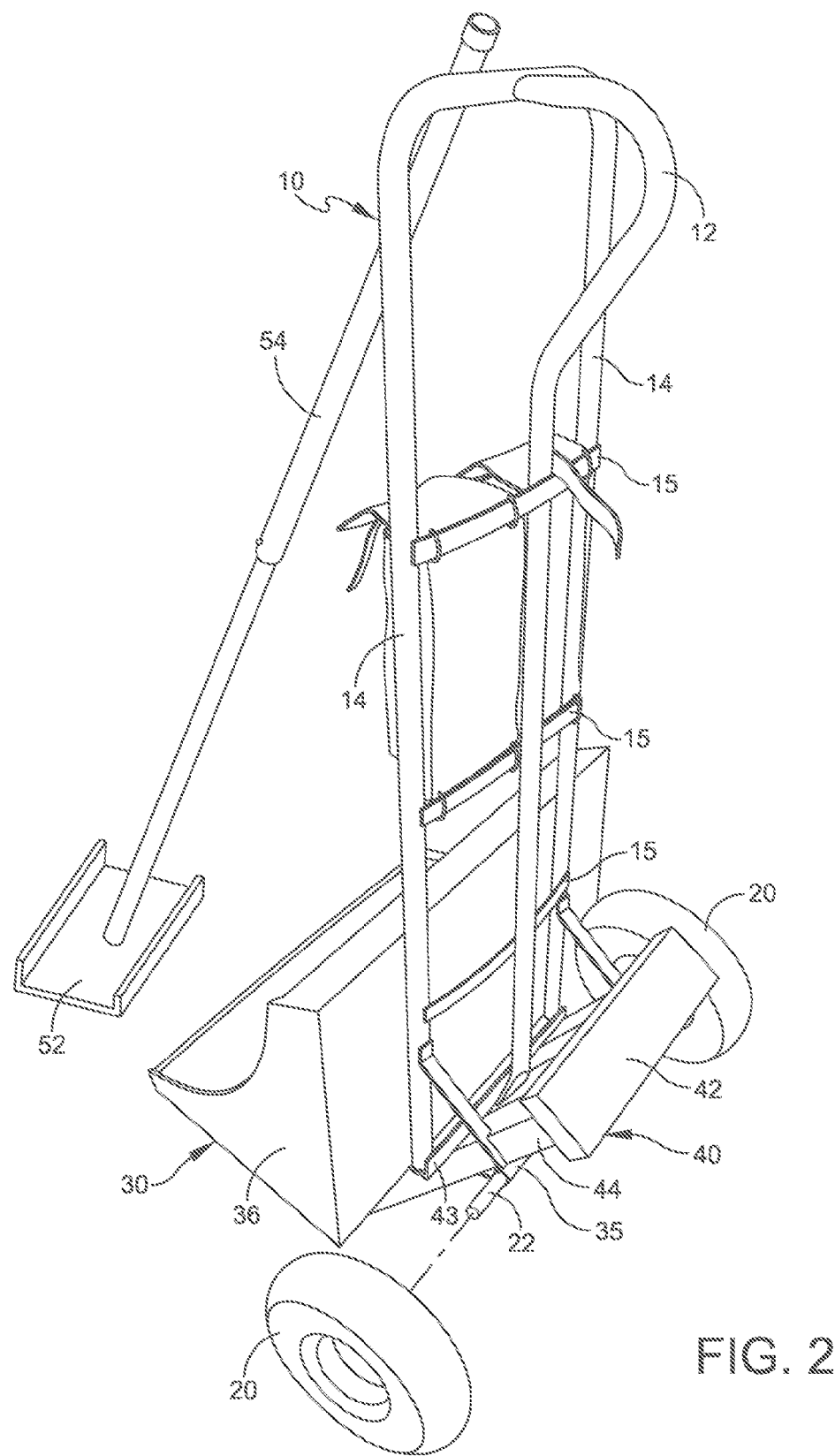
FIG. 2 is a rear perspective view of the utility hand truck of FIG. 1 with a portion of the apparatus exploded away.
Figure 3:
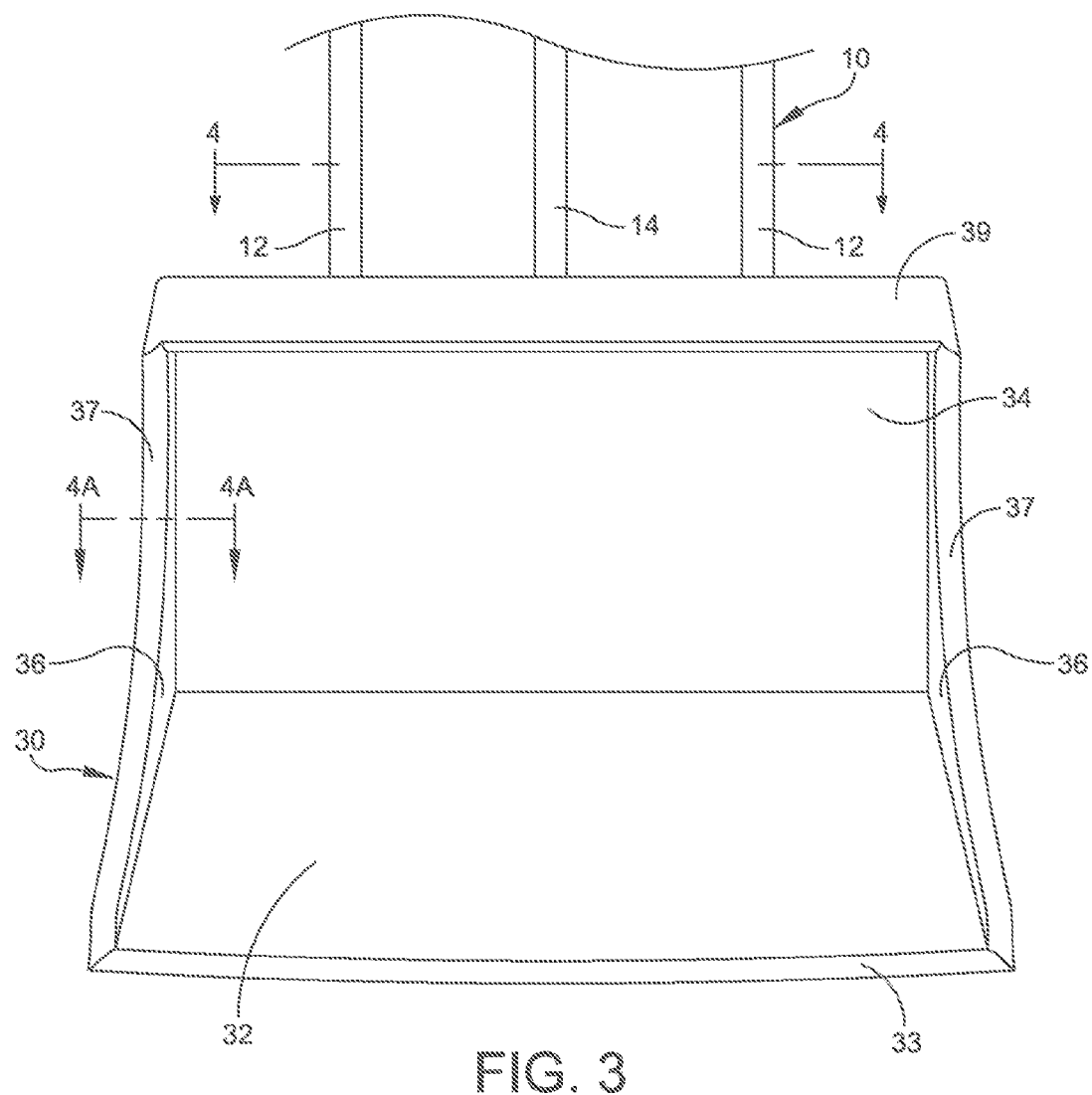
FIG. 3 is a fragmentary front perspective view of the utility hand truck illustrated in FIGS. 1 and 2.

Reference is now made to the drawings and in particular, FIGS. 1-6 that illustrate the utility hand truck of the present invention. This apparatus is very easy to use and can support substantial loads in its bucket. In this way, the hand truck can be used to move heavy boulders, bricks, stones, gravel, loam, sand, dirt, animal feed, cut logs, leaves, and grass clippings.

The hand truck of the present invention can be used to clean up job sites. One advantage of this apparatus is that there is no gasoline, diesel fuel, or oil required; only a minimum amount of human manual effort.

With the apparatus of the present invention, the loading and unloading is performed in a very stable manner. This is unlike the use of a wheel barrow, which is difficult to balance and tends to tip from side to side. With the apparatus of the present invention, the load stays upright and secure. The utility hand truck of the present invention saves a number of hours of labor and back pain, thereby conserving one's limited energy for other tasks. The hand truck of the present invention may be constructed of various materials. In one instance, it may be a lightweight steel or an aluminum/magnesium alloy for heavy-duty abrasive loads such as for carrying bricks, gravel, and sand. Alternatively, the utility hand truck may be constructed of a rigid PVC material for lighter-weight loads.

The utility hand truck of the present invention, as illustrated in the drawings, is comprised an upright frame 10. This frame 10 may be constructed of a tubular material as illustrated in the drawings and preferably includes an intermediate handle member 12. The upright frame is also comprised of elongated, spaced-apart vertical posts 14. For stability and to complete the upright frame there may also be provided a series of horizontally disposed crossbars 15 that extend between these vertical posts 14.

In the embodiment illustrated in the drawings, the various components of the hand truck may be constructed either of metal or of plastic as previously mentioned. The upright frame 10 also includes a bottom end that includes a base support plate 18. Also illustrated are a pair of wheels 20 interconnected by a rigid axle 22. The upright frame 10 may be substantially the same as that found in a conventional hand dolly.

The hand truck of the present also includes a front bucket 30. The front bucket 30 includes a bottom wall 32, a back wall 34, and opposed side walls 36. All of these walls that comprise the bucket are interconnected to form a one-piece bucket structure.

Figure 4A:
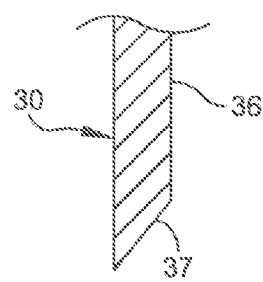
FIG. 4A is a horizontal cross-sectional view through the apparatus taken at line 4A-4A of FIG. 3.
Figure 4:
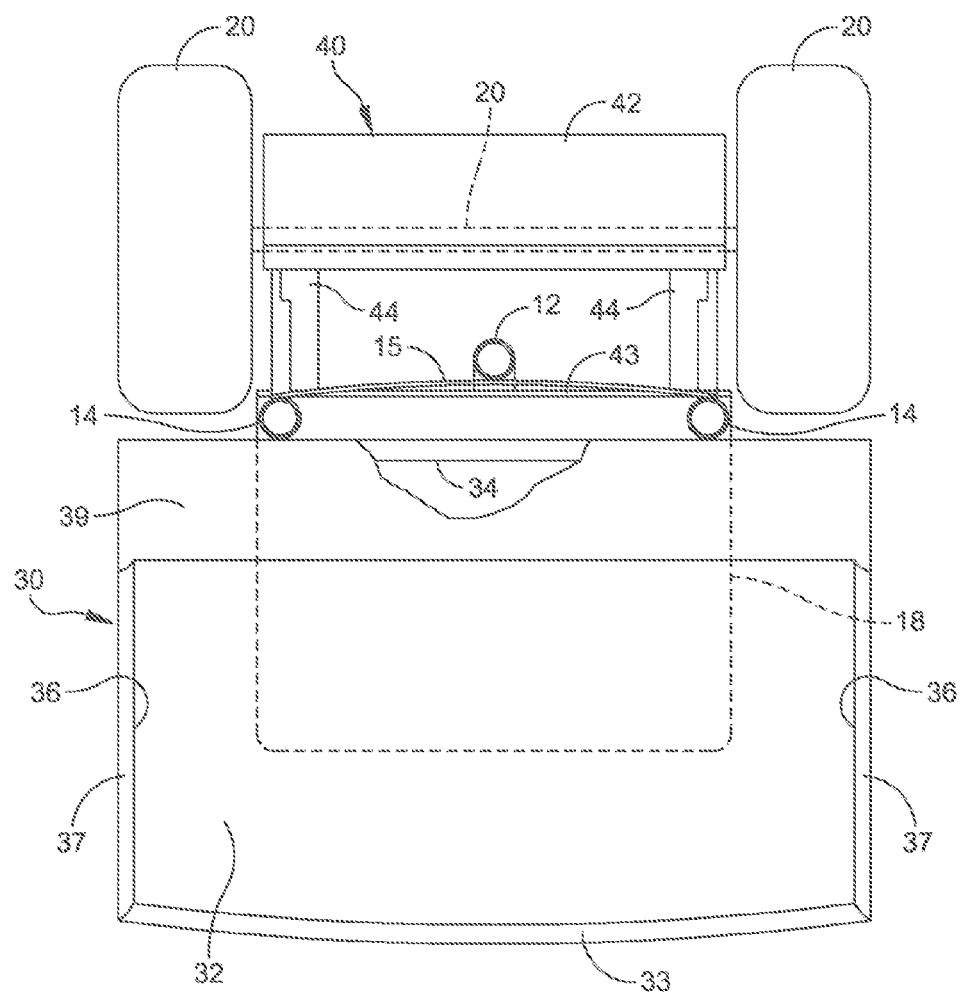
FIG. 4 is a horizontal cross-sectional view through the apparatus taken at line 4-4 of FIG. 3.
Figure 5:
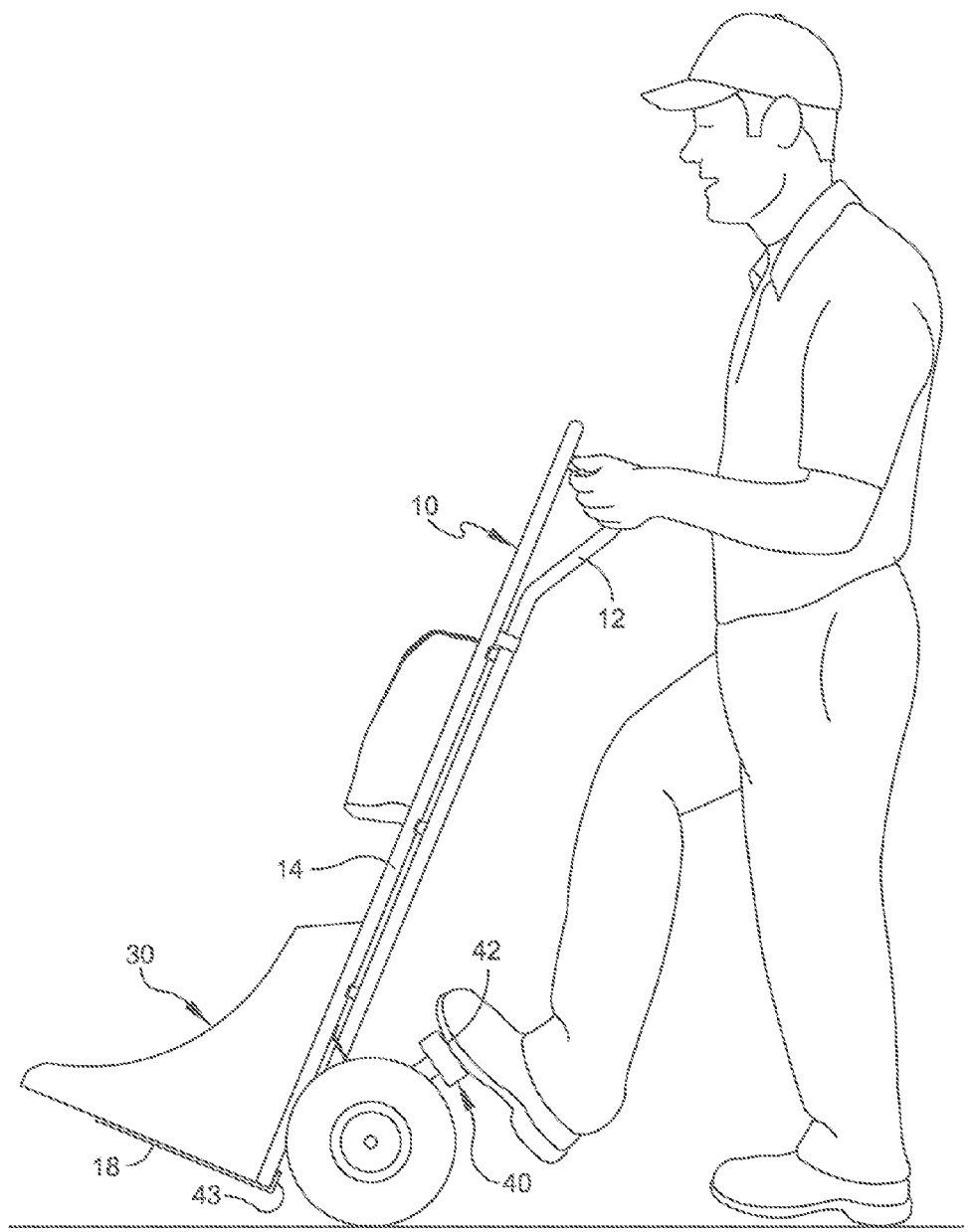
FIG. 5 is a side view of the apparatus illustrated in FIGS. 1-5.

The bottom wall 32 preferably has a downwardly tapered front edge 33. This edge 33 is preferably slightly bowed outwardly in an arcuate manner. Each of the side walls has a forwardly directed and inwardly tapered edge 37. This edge may be tapered at 45 degrees or in a range of 30-60 degrees to the horizontal (see FIG. 4A). This inwardly tapered edge is helpful in positioning any material so that it is retained within the bucket 30. The slightly arcuate and tapered front edge 33 also assists in loading material into the bucket as the bucket is pushed forwardly in the direction of arrow 38. The bucket 30 also preferably has a top wall 39 having a depth that is less than the depth of the bottom wall. The top wall 39 may also be tapered downwardly a slight amount.

As also illustrated in the drawings, at the rear of the utility hand truck there is provided a rear footboard 40. This footboard 40 is positioned slightly above the top of the wheels 20, particularly as shown in the rear perspective view. The rear footboard 40 is constructed and arranged for support from the upright frame and is disposed between the spaced-apart wheels 20. The rear footboard 40 comprises a planar board 42 and a pair of spaced-apart support pieces 44. These support pieces 44 respectively support ends of the rear support board from the upright frame. The planar board 42, may have a cross-sectional dimension of 2 inch by 4 inch. The support pieces 44 may also be of a similar construction and extend from opposite ends of the board 42 down to an upright lip 43 at the lower plate 18. The bottom ends of the support pieces 44 may be bolted to the lip 43. The support pieces 44 may also be attached to the axle 22 to provide additional strength. A small U-shaped clamp 45 may be used for attaching each of the support pieces to the axle 22. This securing arrangement enables the planar support board 42 to be maintained in position. The slope of the planar board 42 is preferable at approximately 45 degrees to the horizontal (see FIG. 5).

The utility hand truck of the present invention is readily manipulated by a user. The rear footboard 40 is useable to, not only push the bucket forward in the direction of arrow 38 but also functions as a pivot for tipping the frame and bucket to an inclined position. This is the position that would be used when moving the material in the bucket from one location to another. Throughout this process of loading and unloading the bucket, the weight of the bucket and its contents never leaves the ground, thereby eliminating any lifting motions.

The bucket of the present invention is preferably attached at the rear surface by means of two pairs of bolts associated with and respectively passing through the upright vertical posts 14. However, the bucket can be readily removed so that the upright frame can also be alternatively used as a standard dolly. Various types of tires and wheels may be used depending upon the particular terrain in which the utility hand truck is used. Also, the hand truck can lay backwards flat as the footboard stays out of the way for accessing bucket contents or transporting in position.

Figure 6:
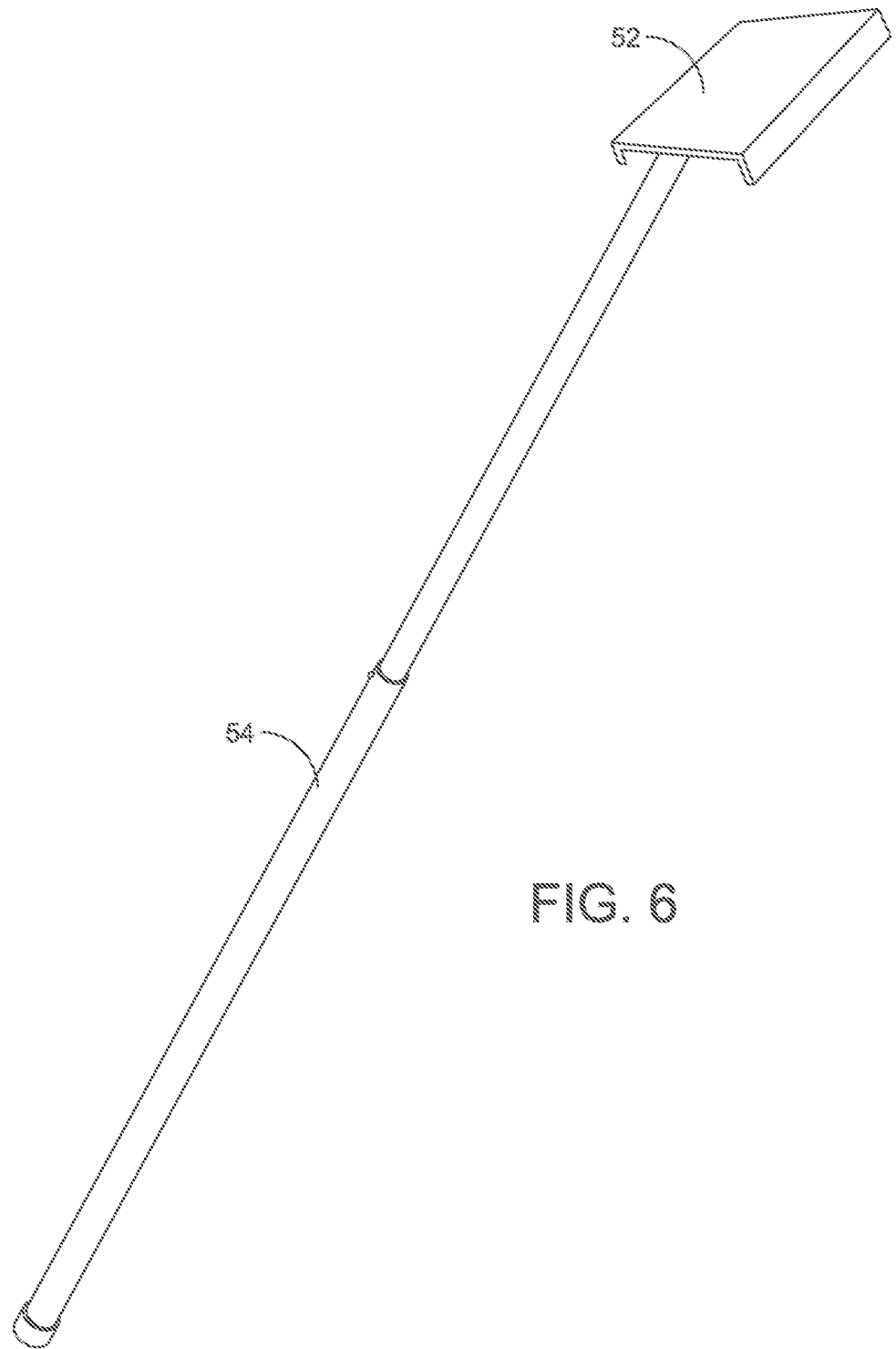
FIG. 6 illustrates the tool and tool holder post associated with the apparatus.

Another aspect of the present invention is the further inclusion of at least one, and preferably a pair of, pouches 50 that are attached to the upright frame and that are for the support of various tools such as illustrated in FIG. 6 herein. This includes different configuration tools 52. Also illustrated is an elongated pole 54. Each of the tools is removably mated with the pole 54. This mating may be by the use of engaging threads. The pole 54 is readily stored in the upright frame behind the handle 12 (see FIG. 1). A small velcro strip may be used for securing the top end of the pole 54 when in place. The pole 54 and associated tool may be used for various purposes relative to the particular operation being carried out.

Having now described a limited number of embodiments of the present invention, it should now be apparent to those skilled in the art that numerous other embodiments and modifications thereof are contemplated as falling within the scope of the present invention, as defined by the appended claims.

What is claimed is:

1. A utility hand truck comprising:
   an upright frame having a top end that includes a handle, elongated spaced apart vertical posts, a bottom end that includes a planar base support plate defining a support plate plane and spaced apart wheels at the bottom end;
   a front bucket;
   securing members that are for removable attachment of the front bucket between the elongated spaced apart vertical posts, and the base support plate;
   and a rear foot board that is constructed and arranged for support from the upright frame and disposed between the spaced apart wheels;
   said bucket constructed and arranged to scoop material at ground level while the rear foot board is useable in pushing the bucket forward and in tilting the upright frame and bucket;
   wherein the rear foot board comprises a planar board and a pair of spaced apart support pieces that respectively support ends of the rear support board from the upright frame;
   wherein the foot board has a top planar surface that is meant for engagement with a user's foot;

wherein the top planar surface of the foot board defines a top surface plane that is disposed at an acute angle to the support plate plane; and wherein the spaced apart support pieces are secured at a top end thereof to the rear foot board and at a lower end thereof to an axle that connects the wheels and the base support plate.

2. The utility hand truck of claim 1 further including a tool and at least one pouch for the tool and attached to the upright frame.

3. The utility hand truck of claim 2 including a tool support post for holding the tool and positioned adjacent to and between the spaced apart vertical posts.

4. The utility hand truck of claim 1 wherein the bucket is comprised of a bottom wall, a back wall and opposed sidewalls, all said walls interconnected to form a one piece bucket.

5. The utility hand truck of claim 4 wherein said bottom wall has a downwardly tapered front edge, and said sidewalls each have a forwardly directed and inwardly tapered edge.

6. The utility hand truck of claim 5 wherein each sidewall has an arcuate contour and further including a top wall having a depth that is less than the depth of the bottom wall.

7. A utility hand truck comprising:
an upright frame having a top end that includes a handle, elongated spaced apart vertical posts, a bottom end that includes a base support plate and spaced apart wheels at the bottom end;
a front bucket;
securing members that are for removable attachment of the front bucket between the elongated spaced apart vertical posts, and the base support plate;
and a rear foot board that is constructed and arranged for support from the upright frame and disposed between the spaced apart wheels;
said bucket constructed and arranged to scoop material at ground level while the rear foot board is useable in pushing the bucket forward and in tilting the upright frame and bucket;
wherein the rear foot board comprises a planar board and a pair of spaced apart support pieces that respectively support ends of the rear support board from the upright frame;
wherein the foot board has a top planar surface that is meant for engagement with a user's foot;
wherein the planar surface is angled at approximately 45 degrees to the vertical; and wherein the spaced apart support pieces are secured at a top end thereof to the rear foot board and at a lower end thereof to an axle that connects the wheels and the base support plate.

8. The utility hand truck of claim 7 further including a tool and at least one pouch for the tool and attached to the upright frame.

9. The utility hand truck of claim 8 including a tool support post for holding the tool and positioned adjacent to and between the spaced apart vertical posts.

10. The utility hand truck of claim 7 wherein the bucket is comprised of a bottom wall, a back wall and opposed sidewalls, all said walls interconnected to form a one piece bucket.

11. The utility hand truck of claim 10 wherein the bottom wall has a downwardly tapered front edge, and said sidewalls each have a forwardly directed and inwardly tapered edge.

12. A combination utility hand truck and tool carrier, comprising:
an upright frame having a top end that includes a handle, elongated spaced apart vertical posts, a bottom end that includes a base support plate and spaced apart wheels at the bottom end; a front bucket for removable attachment between the elongated spaced apart vertical posts, and the base support plate;
and a rear foot board that is constructed and arranged for support from the upright frame and disposed between the spaced apart wheels;
a tool and at least one pouch for the tool and attached to the upright frame;
and a tool support post for holding the tool and positioned adjacent to and between the spaced apart vertical posts;
wherein the rear foot board comprises a planar board and a pair of spaced apart support pieces that respectively support ends of the rear support board from the upright frame;
wherein the foot board has a top planar surface that is meant for engagement with a user's foot;
wherein the top planar surface of the foot board defines a top surface plane that is disposed at an acute angle to the support plate plane; and
wherein the spaced apart support pieces are secured at a top end thereof to the rear foot board and at a lower end thereof to an axle that connects the wheels and the base support plate.

13. The combination of claim 12 wherein said bucket is constructed and arranged to scoop material at ground level while the rear foot board is useable in pushing the bucket forward and in tilting the upright frame and bucket.

14. The combination of claim 12 including side-by-side pouches for holding multiple tools, and wherein the tool support post is capable of receiving any one of a number of different tools.

15. The combination of claim 14 wherein the bucket is comprised of a bottom wall, a back wall and opposed sidewalls, all said walls interconnected to form a one piece bucket.

16. The combination of claim 14 wherein said bottom wall has a downwardly tapered front edge, and said sidewalls each have a forwardly directed and inwardly tapered edge.

17. The combination of claim 16 wherein each sidewall has an arcuate contour and further including a top wall having a depth that is less than the depth of the bottom wall.

18. The combination of claim 12 wherein the foot board has a top planar surface that is angled at approximately 45 degrees to the vertical.

* * * * *